D. LAWSON.
CABLEWAY CARRIAGE.
APPLICATION FILED JAN. 27, 1921.
1,406,987.
Patented Feb. 21, 1922.
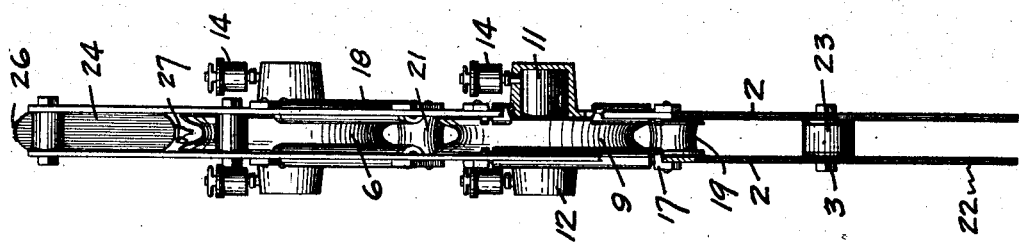
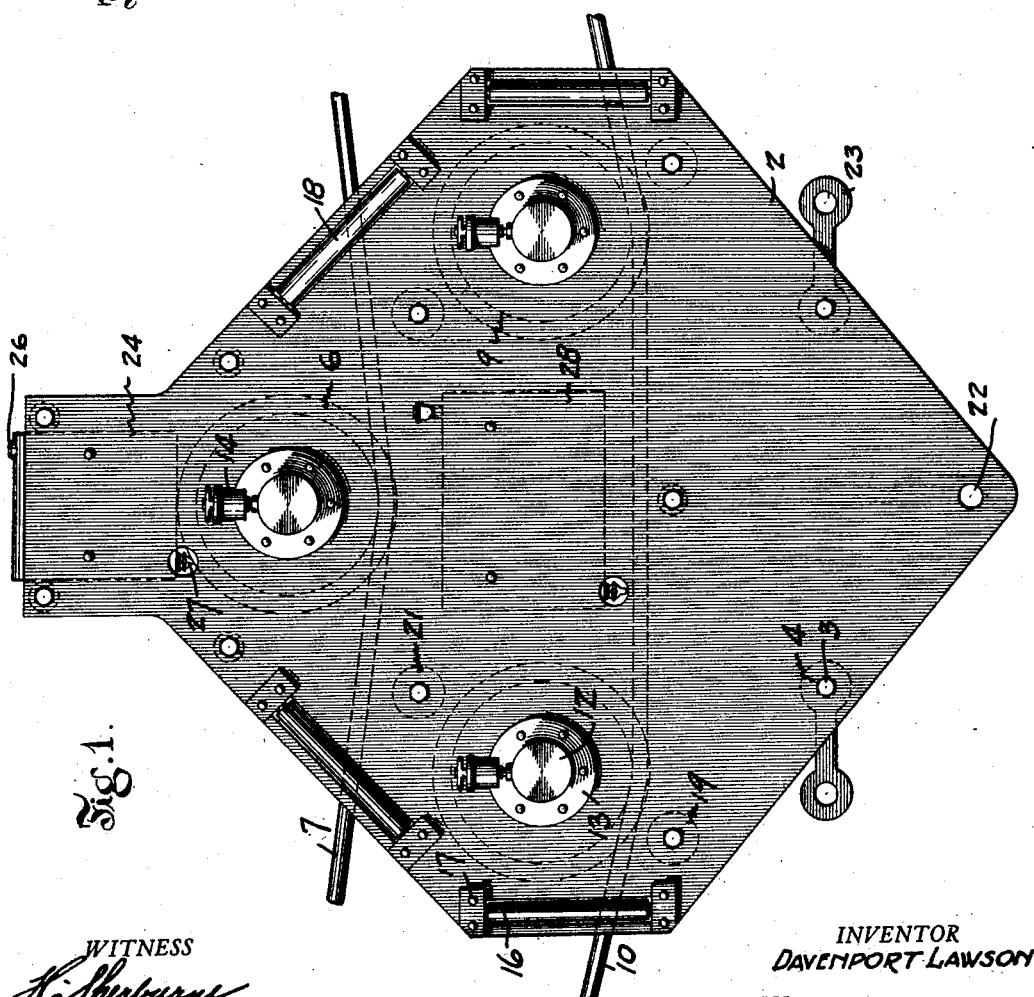
WITNESS
H. Sherburne
INVENTOR
DAVENPORT LAWSON
BY
White Prost & Evans
his ATTORNEYS

UNITED STATES PATENT OFFICE.

DAVENPORT LAWSON, OF ELK, CALIFORNIA, ASSIGNOR TO GOODYEAR REDWOOD CO., OF ELK, CALIFORNIA, A CORPORATION OF MAINE.

CABLEWAY CARRIAGE.

1,406,987.           Specification of Letters Patent.      Patented Feb. 21, 1922.

Application filed January 27, 1921. Serial No. 440,294.

*To all whom it may concern:*

Be it known that I, DAVENPORT LAWSON, a citizen of the United States, and a resident of Elk, county of Mendocino, and State of California, have invented a new and useful Cableway Carriage, of which the following is a specification.

My invention relates to carriages for cableways and especially those used in logging operations.

An object of the invention is to provide a carriage for use on a cableway, which is characterized by improved means for maintaining the proper engagement of the pulleys of the carriage with the cable or cables on which the carriage operates. Another object is the provision of a carriage embodying improved means for lubricating the cables. Another object is the provision of a carriage of exceptionally rugged construction to withstand the tremendous stresses incident to its use in logging operations.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

Referring to the drawings: Fig. 1 is a side elevation of the carriage. Fig. 2 is an end elevation, parts being shown in section.

The cableway carriage of my invention comprises a pair of frame plates 2 held in parallel spaced relation by bolts 3 passing through spacing blocks 4, and arranged at suitable places in the plates. Since the carriage in the present instance is designed for use on two cables, I arrange three grooved pulleys or sheaves between the plates of the frame; an upper pulley 6 for engaging the upper cable 7 and a pair of pulleys 8 and 9 for engaging the lower cable 10, these pulleys being spaced below and one on each side of the upper pulley. This arrangement gives stability to the carriage on the cables because of the wide wheel base, and prevents objectionable swinging or rocking of the carriage about its transverse axis. Each of the pulleys is fixed on a shaft 11 projecting from each side, and these projecting ends are journaled in bearings 12. The bearings are each provided with a flange 13 which is bolted to the frame plates of the carriage, and of course the companion bearings for each pulley are carefully alined. The outside of the bearings is closed as shown in Fig. 2 to prevent the entrance of foreign matter and the escape of lubricant. Fixed in the top of each bearing is a grease cup 14 for supplying the journal with lubricant. It is to be noted that the pulleys are a trifle less in width than the space between the frame plates so that the cables cannot possibly become jammed between pulley and frame and naturally work into the grooves of the pulley after any displacement, and also that ample bearing surface for the pulley shafts is provided by the bearings on the outside of the frame.

Means are provided for preventing engagement of the cables with the edges of the frame plates as the carriage moves over the cables. At each end, and in that portion adjacent the cables, the plates are apertured to receive a roller 16 journaled in bearing blocks 17 bolted to the plate. As best seen in Fig. 2, the rollers are set with inner edges alined with the grooves of the pulley with which they are associated, so that the cable is directed or guided into the pulley without frictional contact with the frame plates. Similar guide rollers 18 are arranged to guide the cable 7 into the pulley 6.

Retaining spools 19 are rotatably mounted below and in front of each pulley 8 and 9, and spools 21 below and on each side of pulley 6. These spools prevent displacement and tangling of the cables, especially from bouncing of the carriage. The frame plates are formed with apertures 22 for securing the lines which carry the load, and movement of the carriage on the cables 7 and 10 is effected by suitable control lines made fast to links 23, which are secured to the carriage, one on each side, by the two lower bolts 3.

Means are provided for lubricating the cables, so that wear on them is reduced to a minimum and frictional resistance is largely eliminated. Arranged between the frame plates above the pulley 6 is a reservoir 24 for liquid lubricant which is introduced into the reservoir through an opening, closed by the vented plug 26. A drip cock 27 is arranged on the reservoir so as to feed the lubricant into the groove of the pulley, from which it is transferred to the cable 7. A similar reservoir 28 is arranged between the pulleys 8 and 9, and drips lubricant upon the cable 10. During the operation of the carriage, lubricant is transferred to the guide rolls so that all parts of the carriage are kept fully lubricated.

I claim:

1. A cableway carriage comprising spaced plates, pulleys for engaging the cable disposed between said plates, a lubricant reservoir disposed between said plates above the line of the cable, and means for feeding lubricant from said reservoir to said cable.

2. A cableway carriage comprising spaced plates, pulleys for engaging the cable arranged between said plates, a lubricant reservoir disposed between said plates and between said pulleys above said cable, and a drip spout in said reservoir for feeding lubricant upon said cable.

3. A cableway carriage comprising spaced flat plates, pulleys for engaging the cable disposed between said plates, and bearings for said pulleys arranged on the outside of said plates.

4. A cableway carriage comprising spaced plates, alined bearings arranged on the outside of said plates, a shaft journaled in said bearings, and a pulley for engaging the cable fixed on said shaft between said plates, said pulley being of such thickness as to leave only a working clearance between it and said plates.

5. A cableway carriage comprising a frame, a pulley in said frame for engaging the cable, and rollers journaled in said frame for guiding said cable into said pulley.

6. A cableway carriage comprising a frame, a pulley for engaging the cable journaled in said frame, and a roller journaled in said frame on each side of said pulley on an axis lying in a plane perpendicular to the axis of said pulley.

7. A cableway carriage comprising spaced plates, a pair of alined bearings arranged on the outside of said plates at opposite ends thereof, a shaft journaled in each pair of bearings, a pulley for engaging the cable fixed on each shaft between the plates, rollers journaled in said frame on each side to guide said cable into the pulleys, and means on said frame for feeding a lubricant upon said cable.

8. A cableway carriage for use on two cables comprising a pair of spaced plates, means for fixing said plates in spaced relation, a pulley arranged between said plates and journaled therein for engaging one of said cables, a pair of pulleys arranged between said plates and journaled therein for engaging the other of said cables, said pair of pulleys being arranged below and one on each side of said first named pulley, rollers journaled in said plates on both sides of said pulleys for guiding said cables into the pulleys, and means on said frame for feeding a lubricant upon said cables.

In testimony whereof, I have hereunto set my hand.

DAVENPORT LAWSON.